United States Patent

Jacob Sushil et al.

(10) Patent No.: US 9,043,220 B2
(45) Date of Patent: May 26, 2015

(54) DEFINING MARKETING STRATEGIES THROUGH DERIVED E-COMMERCE PATTERNS

(75) Inventors: George T. Jacob Sushil, Bangalore (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 12/907,680

(22) Filed: Oct. 19, 2010

(65) Prior Publication Data

US 2012/0095770 A1   Apr. 19, 2012

(51) Int. Cl.
*G06Q 10/00* (2012.01)
*G06Q 30/02* (2012.01)

(52) U.S. Cl.
CPC ......... *G06Q 30/0202* (2013.01); *G06Q 30/02* (2013.01); *G06Q 30/0201* (2013.01)

(58) Field of Classification Search
USPC ............................. 705/7.11–7.42, 14.4–14.49
See application file for complete search history.

(56) References Cited

U.S. PATENT DOCUMENTS

| | | | | |
|---|---|---|---|---|
| 6,014,647 | A * | 1/2000 | Nizzari et al. | 705/39 |
| 6,183,362 | B1 * | 2/2001 | Boushy | 463/25 |
| 6,356,633 | B1 * | 3/2002 | Armstrong | 379/265.11 |
| 6,712,698 | B2 * | 3/2004 | Paulsen et al. | 463/30 |
| 6,836,773 | B2 * | 12/2004 | Tamayo et al. | 1/1 |
| 6,859,529 | B2 * | 2/2005 | Duncan et al. | 379/266.1 |
| 6,962,531 | B2 * | 11/2005 | Pace et al. | 463/42 |
| 6,968,315 | B1 * | 11/2005 | Nakisa | 705/7.29 |
| 6,970,830 | B1 * | 11/2005 | Samra et al. | 705/7.28 |
| 7,043,531 | B1 * | 5/2006 | Seibel et al. | 709/206 |
| 7,050,567 | B1 * | 5/2006 | Jensen | 379/266.01 |
| 7,222,085 | B2 * | 5/2007 | Stack | 705/7.29 |
| 7,315,861 | B2 * | 1/2008 | Seibel et al. | 1/1 |
| 7,330,873 | B2 * | 2/2008 | Yoshida et al. | 709/203 |
| 7,353,182 | B1 * | 4/2008 | Missinhoun et al. | 705/7.12 |
| 7,587,377 | B2 * | 9/2009 | Ren | 706/45 |
| 7,698,163 | B2 * | 4/2010 | Reed et al. | 705/7.33 |
| 7,765,121 | B2 * | 7/2010 | Pace et al. | 705/7.13 |
| 7,827,061 | B2 * | 11/2010 | Ramsey et al. | 705/14.43 |
| 7,881,924 | B2 * | 2/2011 | Shaw | 704/9 |
| 7,930,302 | B2 * | 4/2011 | Bandaru et al. | 707/737 |
| 7,941,339 | B2 * | 5/2011 | Argaiz | 705/14.49 |

(Continued)

FOREIGN PATENT DOCUMENTS

WO    WO 2006040405 A1 *   4/2006

OTHER PUBLICATIONS

Richardson, Matthew, and Pedro Domingos. "Mining knowledge-sharing sites for viral marketing." Proceedings of the eighth ACM SIGKDD international conference on Knowledge discovery and data mining. ACM, 2002.*

(Continued)

*Primary Examiner* — Alan S Miller
(74) *Attorney, Agent, or Firm* — Stephen R. Tkacs; Stephen J. Walder, Jr.; William J. Stack

(57) ABSTRACT

A mechanism, in a data processing system, is provided for defining marketing strategies. The mechanism dynamically obtains information related to customer interactions associated with a plurality of customers, analyzes the information to identify patterns, selects patterns to define a marketing strategy for a marketer, and defines a marketing strategy based on the selected patterns.

18 Claims, 3 Drawing Sheets

(56) References Cited

U.S. PATENT DOCUMENTS

| | | | |
|---|---|---|---|
| 8,000,990 B2* | 8/2011 | Pace et al. | 705/7.12 |
| 8,108,414 B2* | 1/2012 | Stackpole | 707/758 |
| 8,140,391 B2* | 3/2012 | Jacobi et al. | 705/14.53 |
| 8,375,024 B2* | 2/2013 | Goeldi | 707/722 |
| 8,386,564 B2* | 2/2013 | Pennington | 709/204 |
| 8,396,741 B2* | 3/2013 | Kannan et al. | 705/7.42 |
| 8,458,002 B2* | 6/2013 | Chafle et al. | 705/7.13 |
| 8,499,247 B2* | 7/2013 | Niyogi et al. | 715/753 |
| 8,682,723 B2* | 3/2014 | Parsons et al. | 705/14.52 |
| 2002/0087385 A1* | 7/2002 | Vincent | 705/10 |
| 2002/0107712 A1* | 8/2002 | Lam et al. | 705/8 |
| 2002/0107715 A1* | 8/2002 | Pace et al. | 705/8 |
| 2003/0050928 A1* | 3/2003 | Hays | 707/6 |
| 2003/0097367 A1* | 5/2003 | Ma et al. | 707/102 |
| 2003/0131052 A1* | 7/2003 | Allan | 709/203 |
| 2003/0135512 A1* | 7/2003 | Morgan et al. | 707/102 |
| 2003/0188037 A1* | 10/2003 | Elberse | 709/311 |
| 2004/0015386 A1* | 1/2004 | Abe et al. | 705/10 |
| 2004/0267604 A1* | 12/2004 | Gross | 705/10 |
| 2005/0015376 A1* | 1/2005 | Fraser et al. | 707/10 |
| 2005/0154556 A1* | 7/2005 | Keller et al. | 702/181 |
| 2006/0004731 A1* | 1/2006 | Seibel et al. | 707/3 |
| 2006/0009994 A1* | 1/2006 | Hogg et al. | 705/1 |
| 2006/0042483 A1* | 3/2006 | Work et al. | 101/91 |
| 2006/0136462 A1* | 6/2006 | Campos et al. | 707/102 |
| 2006/0143081 A1* | 6/2006 | Argaiz | 705/14 |
| 2006/0253469 A1* | 11/2006 | Ramsey et al. | 707/100 |
| 2007/0094083 A1* | 4/2007 | Yruski et al. | 705/14 |
| 2007/0121843 A1* | 5/2007 | Atazky et al. | 379/114.13 |
| 2007/0198510 A1* | 8/2007 | Ebanks | 707/5 |
| 2007/0214097 A1* | 9/2007 | Parsons et al. | 706/12 |
| 2007/0294281 A1* | 12/2007 | Ward et al. | 707/102 |
| 2008/0109491 A1* | 5/2008 | Gupta | 707/104.1 |
| 2008/0120261 A1* | 5/2008 | John et al. | 706/45 |
| 2008/0140506 A1* | 6/2008 | Christianson et al. | 705/10 |
| 2008/0147487 A1* | 6/2008 | Hirshberg | 705/10 |
| 2008/0154825 A1* | 6/2008 | Ren | 706/45 |
| 2008/0255934 A1* | 10/2008 | Leventhal et al. | 705/14 |
| 2009/0048904 A1* | 2/2009 | Newton et al. | 705/10 |
| 2009/0055435 A1* | 2/2009 | Kiviluoto et al. | 707/104.1 |
| 2009/0063254 A1* | 3/2009 | Paul et al. | 705/10 |
| 2009/0063284 A1* | 3/2009 | Turpin et al. | 705/14 |
| 2009/0070129 A1* | 3/2009 | Inbar et al. | 705/1 |
| 2009/0119173 A1* | 5/2009 | Parsons et al. | 705/14 |
| 2009/0125377 A1* | 5/2009 | Somji et al. | 705/10 |
| 2009/0217178 A1* | 8/2009 | Niyogi et al. | 715/753 |
| 2009/0222313 A1* | 9/2009 | Kannan et al. | 705/9 |
| 2009/0307057 A1* | 12/2009 | Azout et al. | 705/10 |
| 2009/0319359 A1* | 12/2009 | Soza et al. | 705/14.25 |
| 2010/0036690 A1* | 2/2010 | Chafle et al. | 705/7 |
| 2010/0070485 A1* | 3/2010 | Parsons et al. | 707/709 |
| 2010/0121849 A1* | 5/2010 | Goeldi | 707/736 |
| 2010/0145771 A1* | 6/2010 | Fligler et al. | 705/10 |
| 2010/0312649 A1* | 12/2010 | Lurie | 705/14.66 |
| 2011/0093318 A1* | 4/2011 | Guday et al. | 705/14.13 |
| 2011/0125550 A1* | 5/2011 | Erhart et al. | 705/7.29 |
| 2011/0125580 A1* | 5/2011 | Erhart et al. | 705/14.54 |
| 2011/0125697 A1* | 5/2011 | Erhart et al. | 706/47 |
| 2011/0125793 A1* | 5/2011 | Erhart et al. | 707/776 |
| 2011/0125826 A1* | 5/2011 | Erhart et al. | 709/202 |
| 2011/0276513 A1* | 11/2011 | Erhart et al. | 705/347 |
| 2011/0288897 A1* | 11/2011 | Erhart et al. | 705/7.13 |

OTHER PUBLICATIONS

Glance, Natalie, et al. "Deriving marketing intelligence from online discussion." Proceedings of the eleventh ACM SIGKDD international conference on Knowledge discovery in data mining. ACM, 2005.*

Kohavi, Ron. "Mining e-commerce data: The good, the bad, and the ugly." Proceedings of the seventh ACM SIGKDD international conference on Knowledge discovery and data mining. ACM, 2001.*

Leskovec, Jure, Ajit Singh, and Jon Kleinberg. "Patterns of influence in a recommendation network." Advances in Knowledge Discovery and Data Mining. Springer Berlin Heidelberg, 2006. 380-389.*

"A Race to the Bottom: Privacy Ranking of Internet Service Companies", http://www.privacyinternational.org/article.stml?cmd[347]=x-347-553961, Privacy International, Sep. 6, 2007, pp. 1-9.

Amer-Yahia, Sihem et al., "SocialScope: Enabling Information Discovery on Social Content Sites", http://arxiv.org/ftp/arxiv/papers/0909/0909.2058.pdf, 4th Biennial Conference on Innovative Data Systems Research (CIDR), Asilomar, California, US, Jan. 4-7, 2009, pp. 1-11.

Doyle, Shaun, "The Role of Social Networks in Marketing", http://www.cognitivebox.com/page4/files/social-networks.pdf, Database Marketing & Customer Strategy Management, vol. 15, 1, 2007, pp. 60-64.

Gursel, Anil et al., "Improving Search in Social Networks by Agent Based Mining", http://ijcai.org/papers09/Papers/IJCAI09-335.pdf, Proceedings of the 21st International Joint Conference on Artificial Intelligence, Pasadena, California, US., 2009, pp. 2034-2039.

Han, Yo-Sub et al., "Evaluation of User Reputation on YouTube", http://www.springerlink.com/content/g62221n181876124, Online Communities, LNCS 5621, 2009, pp. 346-353.

Krayewski, Kaila, "Social Networking Ranks as Second Most Important Social Activity", isedb.com, http://www.isedb.com/db/articles/2143/1/social-networking-ranks-as-second-most-important-social-activity/page1.html, Oct. 1, 2009, 2 pages.

Lawson, Karen, "Joining the Semantic Web and Information Visualization", IEEE Distributed Systems Online, 1541-4922, IEEE Computer Society, vol. 5, No. 2, Feb. 2004, pp. 1-3.

Rosen, Christine, "Virtual Friendship and the New Narcissism", http://www.thenewatlantis.com/publications/virtual-friendship-and-the-new-narcissism, The New Atlantis, No. 17, Summer 2007, pp. 15-31.

U.S. Appl. No. 13/459,678, 1 page.

* cited by examiner

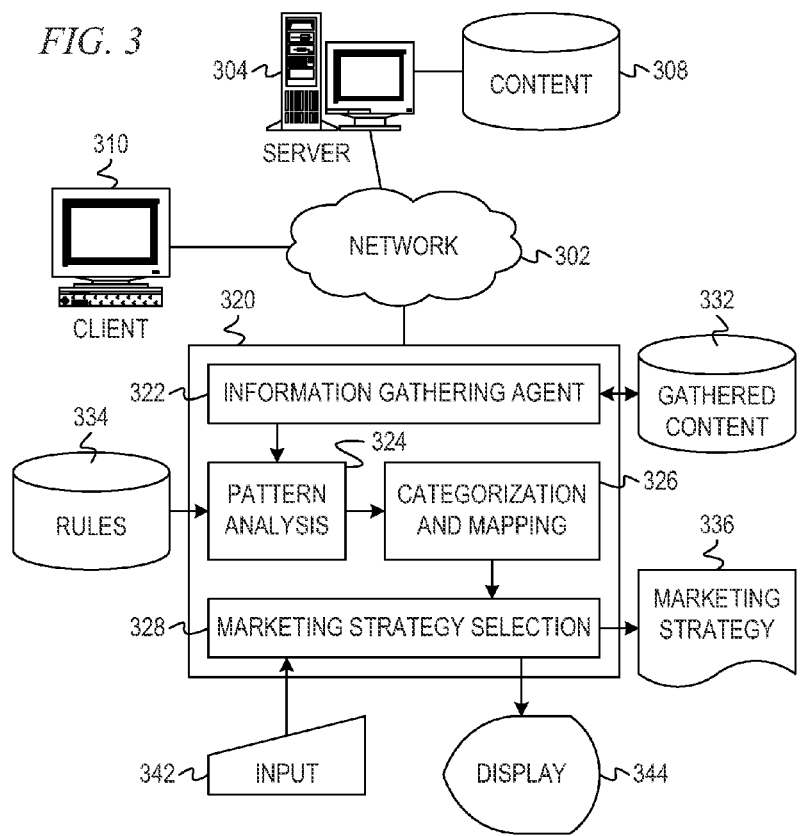
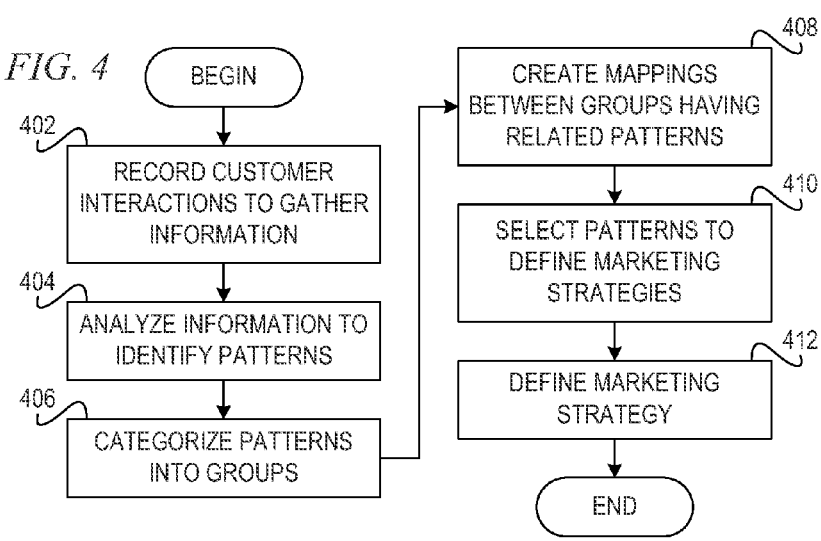

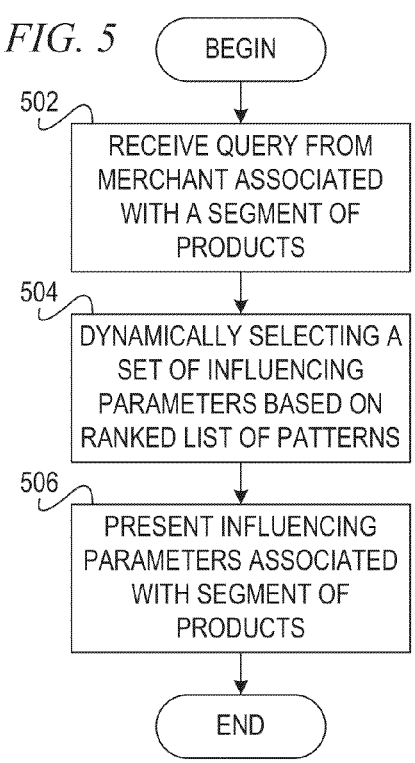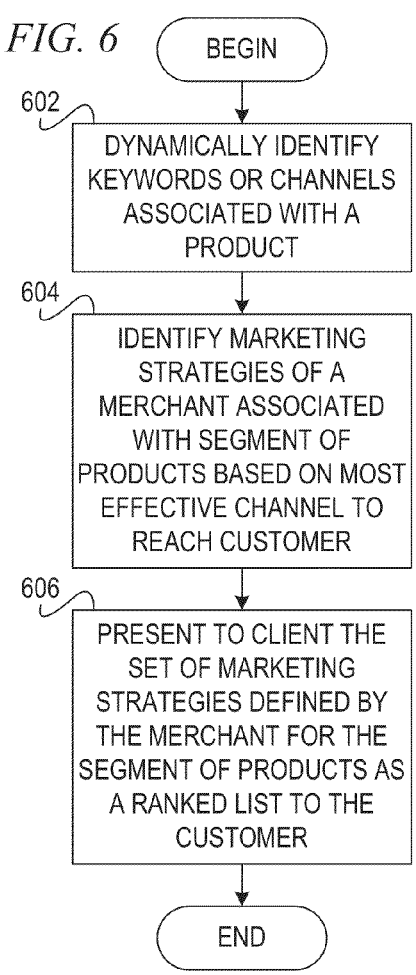

DEFINING MARKETING STRATEGIES THROUGH DERIVED E-COMMERCE PATTERNS

BACKGROUND

The present application relates generally to an improved data processing apparatus and method and more specifically to defining marketing strategies. More particularly, the present application relates to mechanisms for defining marketing strategies and improving marketing segments for merchants.

Typically in on-line commerce transactions, merchants sell their products specifically to a set of loyal customers and try to expand their sales by acquiring new customers using the set of loyal customers interested in the merchant's products. An existing customer base is an excellent source for finding and expanding the customer base by adding new customers. The merchant may expand the customer base due to existing customers' goodwill to the merchant when existing customers share positive information about buying experiences, the product, and the merchant, thereby improving sales for the merchant.

SUMMARY

In one illustrative embodiment, a method, in a data processing system, is provided for defining marketing strategies. The method comprises dynamically obtaining, by the data processing system, information related to customer interactions associated with a plurality of customers, analyzing, by the data processing system, the information to identify patterns, selecting, by the data processing system, patterns to define a marketing strategy for a marketer, and defining, by the data processing system, a marketing strategy based on the selected patterns.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating a system for defining marketing strategies in accordance with an illustrative embodiment;

FIG. 4 is a flowchart illustrating operation of a marketing system for defining marketing strategies in accordance with an illustrative embodiment;

FIG. 5 is a flowchart illustrating operation of a marketing system defining a marketing strategy in accordance with an illustrative embodiment; and FIG. 6 is a flowchart illustrating operation of a marketing system identifying merchants in accordance with an illustrative embodiment.

DETAILED DESCRIPTION

The illustrative embodiments provide a mechanism for defining marketing strategies for a merchant and identifying a customer segment by mining information and associating collected information into a set of predefined patterns. For example, commerce patterns include all such freely available information and activities related to a particular merchant, product, brand, channel of communication, and segment/category of products. The mechanism of the illustrative embodiments may perform data mining, Web crawling, scuttering, and the like to collect relevant information for defining a marketing strategy. The mechanism then performs analysis on the collected information to identify patterns according to a predefined set of rules. The mechanism may group or categorize the patterns and rank the groups or patterns. The mechanism may also create mappings of related patterns, such as related consumers, products, or combinations thereof.

The merchant may then define a promotional strategy and identify the marketing or customer segment to be targeted. For example, the merchant may define a promotional offer to apply to a particular group of customers. The merchant may then apply this promotion and associate it to the respective customer segment and send the promotional information, thus allowing the merchant to expand the customer base. The merchant may make a promotional offer to a new customer who queries the merchant, for example, based on information received from an existing customer, and the merchant may further reward the existing customer.

Figure 1:
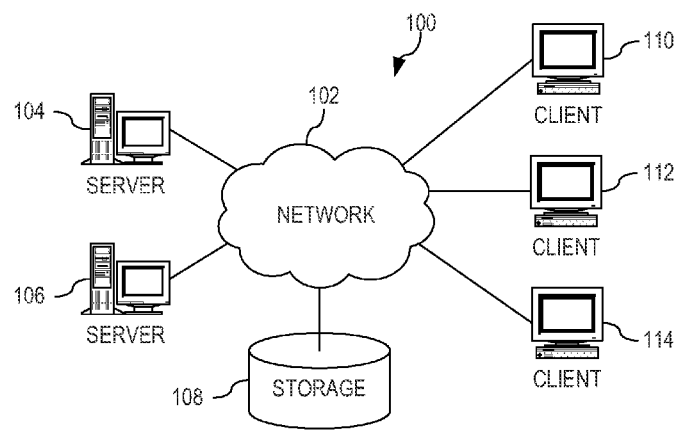
FIG. 1 depicts a pictorial representation of an example distributed data processing system in which aspects of the illustrative embodiments may be implemented.
Figure 2:
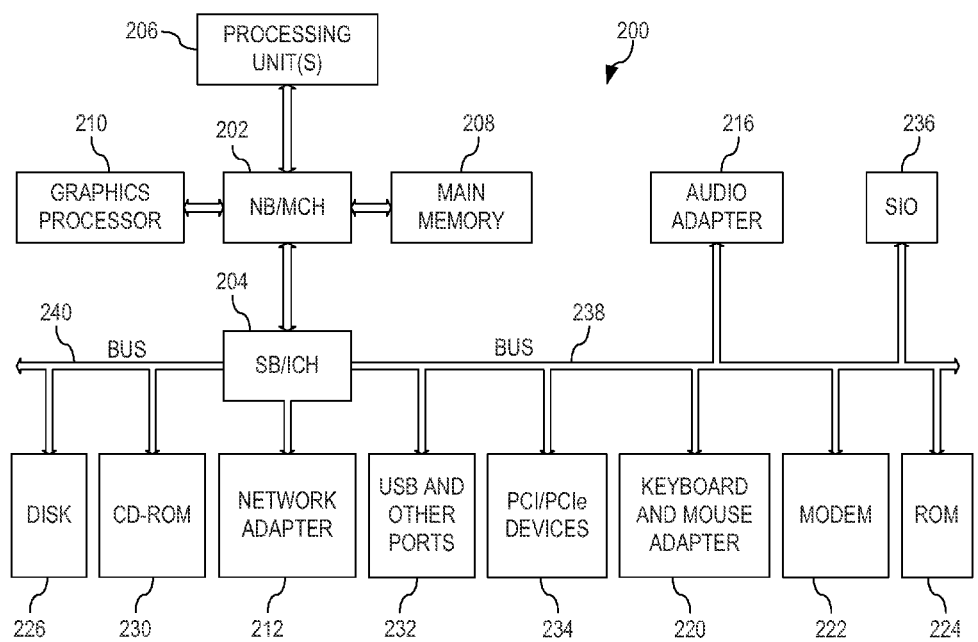
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In one embodiment, a system provides value from a marketing perspective by involving customers to act as product or brand ambassadors. No matter how good or loyal a customer is, he is not always willing to do something for the product or brand when there is no return or reward for the customer. Generally, a reward program is a good marketing strategy. For example, one such reward program may provide points for certain actions, which may be accumulated by the customer and then "spent" in a predefined manner. Not only is it important to align with influential people, but any information about commerce related activity that is popular among consumers is very valuable.

The mechanism of the illustrative embodiments gathers influential commerce patterns using data mining, Web crawling, and scuttering. Data mining is the process of extracting patterns from data. Data mining is seen as an increasingly important tool by modern business to transform data into an informational advantage. A Web crawler is a computer program that browses the World Wide Web in a methodical, automated manner or in an orderly fashion. Other terms for Web crawlers are ants, automatic indexers, bots, or Web spiders, Web robots, or—especially in the friend-of-a-friend community—Web scutters. Friend-of-a-friend (FOAF) is a machine-readable ontology describing persons, their activities and their relations to other people and objects. Scuttering is a form of Web crawling that navigates public networks, message boards, forums and the like. For example, the mechanism of the illustrative embodiments may visit a Web log (blog) and then navigate to Web sites of people who subscribe to the blog.

In example embodiments, the mechanism may crawl through documents containing content or information including, but not limited to, resource description framework (RDF) or extensible markup language (XML) documents, and all traces of the communication, interconnected networks and interconnected documents such as Web logs, click streams, Web pages, or the like. The mechanism then analyzes the information to identify a set of patterns. The set of patterns may include influential patterns based on which the merchant may define an effective market segment and effective marketing strategies for a customer or set of customers.

FIG. 3 is a block diagram illustrating a system for defining marketing strategies in accordance with an illustrative embodiment. Network 302 connects to server 304 and client 310. Server 304 provides access to content 308. Client 310 may access or create content within content 308. For example, server 304 may be an online storefront, and a user of client 310 may create product reviews that are ultimately stored in content 308. In another example, server 304 may provide a medium to interconnect, and a user of client 310 may provide content in the form of interactions like comments, posts and other forms of digital conversations. In yet another example, server 304 may be a user's personal blog site, and a user of client 310 may submit blog posts or comments to server 304. In still another example, server 304 may provide a message board or fan site, and a user of client 310 may write posts to the message board or fan site. In an illustrative embodiment, network 302 may be the Internet and may connect many such servers providing any combination of the above examples, as well as other sources of content.

More specifically, users of client devices, such as client 310, may post reviews of products through interconnected networks and documents, for example. Other users may post comments or reply posts. Users may subscribe to feeds of posts or status updates to receive these product reviews. Some users may be loyal consumers, maintaining fan sites for a particular brand or product. Still other users may maintain what are called anti-fan sites, denouncing particular products or companies. All this information may be very valuable to a marketer.

Marketing system 320 connects to network 302. Marketing system 320 may be a data processing system, such as one of clients 110-114 or servers 104, 106 in FIG. 1, running software to achieve the functionality described hereafter. Marketing system 320 comprises information gathering agent 322, pattern analysis component 324, categorization and mapping component 326, and marketing strategy selection component 328. Information gathering agent 322 accesses servers, such as server 304, to gather and store gathered content 332.

In an alternative embodiment, client 310 may run a client-side agent that forwards relevant content to information gathering agent 322. For example, client 310 may include a browser plug-in, a terminate-and-stay resident (TSR) program, or the like. In one embodiment, the user of client 310 may instruct a client-side agent to submit product reviews to marketing system 320.

Consider the scenario where a merchant wants to sell particular products by targeting a given set of customers. The question for the merchant is to determine the most valued customer or customer segments in order to target promotion products. In order to achieve this, the merchant must identify and track the most influential customers and the key customer experience, which allows the merchant to define marketing strategies for the product in question. On the other hand, for the customer it is simply a question of why the customer needs to be on the influential list or how and why the customer should influence others.

Expanding business horizons is crucial to a merchant, especially in a space in which severe competition exists between merchants to sell products or establish brands. Therefore, one way for the merchant to have the products or brands sold is to define a set of influencing parameters, for example in one embodiment such a parameter may be the customer himself, and based on these influencing parameters, define marketing strategies that enable better sales, thereby benefiting the merchant, the brand, and the customer.

Pattern analysis component 324 analyzes gathered content 332 to identify patterns based on pre-defined rules 334 defined by the merchant. Customer interaction may include customer feedback, customer recommendations, and the like. In one embodiment, an intelligent agent may be included which is configured to selectively choose customer interaction based on the keywords. Once the customer feedback is recorded and classified, pattern analysis component analyzes the customer interactions to identify patterns. In one embodiment, analysis may be based on a set of pre-defined rules 334 defined by the merchant. Pattern analysis component 324 may use various other artificial intelligence techniques for pattern recognition and identification within the spirit and scope of this disclosure. Pattern analysis component 324 may identify recurring patterns or effective patterns.

Categorization and mapping component 326 categorizes the patterns into groups and creates mappings between groups having related patterns. Categorization and mapping component 326 may generate a ranked list. In one embodiment, categorization and mapping component 326 may create a mapping between different groups that have some resemblance between each other. Such a mapping may link various groups with some related patterns or classify one pattern into multiple groups. If there are no groups, then categorization and mapping component 326 may form a new group and allocate the patterns to one such group. The mapping can be in the form of a strong mapping between groups or a weak mapping between the groups. Categorization and mapping component 326 may define a scale with strongest being the highest on the scale and weakest being the lowest on the scale and for each of the mapping a mapping on this relative scale can be made between the groups. Categorization and mapping component 326 may store ranked lists of patterns in a repository, which may comprise structured or unstructured data.

Marketing strategy selection component 328 communicates with display 344 to present the patterns available in the groups and receives input from a merchant through input 342. The merchant may manipulate the gathered content and groups to define a marketing strategy 336. Marketing strategy selection component 328 may present the best possible mapping to the merchant for a product, for example, and the merchant, based on the patterns, may define the best possible marketing strategies. Such strategies will be beneficial to the merchant and the customers.

A commerce system as referenced herein refers to an entire online system comprising the stores, consumers, sales force, inventory force, consumer facing activities, such as interdocuments, posting, review, etc. The key for any merchant is to define marketing rules that dynamically generate the customer network. In one embodiment, recording the customer transaction may induce a further transaction. For example, the marketing system may send a coupon to clients and may track the path the coupon takes to form such a network.

In one exemplary embodiment consider a commerce system that can generate coupons having some form of unique identification like a serial number, which can be associated as an identity. These coupons can target individuals, informing a customer of a certain percentage reduction in price. The customer may forward the coupon through a network of customers, or even outside the network, for example to individuals who are known to those in the network but do not belong to the network. One individual, within the network or outside the network, may find the coupon interesting and return to the store to redeem the coupon. In this instance, the marketing system may track the path taken by the coupon from the start to the end, and the tracking process is one exemplary embodiment that can be utilized to generate/build the network of consumers.

In a further exemplary embodiment, consider a merchant who has a promotional offer of buying four shirts and paying the cost only of three shirts, in which sense, by buying three shirts, the fourth shirt would be free. Customers can seek out other customers who might need a shirt and gather customers, thereby forming a group who will be willing to combine their purchases. For instance four customers can combine, pay for three shirts and get the fourth shirt free. One coupon and/or one consumer thus provide a list of four different customers as contacts. This kind of relationship between customers who want to purchase a particular product and forming group of such customers which will benefit the customers and the merchants can be done by various methodologies that are known to a person of ordinary skill in the art, such as a website, SMS or the likes.

In yet a further exemplary embodiment, the customer may provide specific/generic feedback and/or information, and may also translate into a chain, such as a review. The marketing system may induce transactions to generate such a network. Examples are given below to illustrate how transactions can be induced to generate a network, for example, where a customer can be made an offer to write three reviews of hotels that he may have visited, the feedback should be comprehensive, in return for doing this the customer is offered 20% discount on airfares or may be added air miles. For this the customer may provide all three reviews himself or, alternatively, may invite people to complete reviews on his account.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 4 is a flowchart illustrating operation of a marketing system for defining marketing strategies in accordance with an illustrative embodiment. Operation begins, and the system records customer interactions to gather information (block 402). Customer interactions may include customer feedback, customer recommendations, and the like. The system analyzes information to identify patterns (block 404). The system may analyze the information based on a set of pre-defined rules defined by the merchant. The system may use various other artificial intelligence techniques for pattern recognition and identification within the spirit and scope of the illustrative embodiments.

Then, the system categorizes the patterns into groups (block 406). The system may generate a ranked list. The system creates mappings between groups having related patterns (block 408). A mapping may link various groups with some related patterns and may identify one pattern into multiple groups. If there are no groups, then the system may form a new group and allocate related patterns to one such group to form a mapping. A mapping may be a strong mapping or a weak mapping, or the system may use a scale of mappings with strongest mappings being the highest on the scale and weakest mappings being the weakest on the scale.

Based on the information present in the patterns and the various patterns available in the groups, the system selects patterns to define marketing strategies (block 410). Then, the system defines a marketing strategy based on user interaction and manipulation of the patterns of information and selected patterns (block 412). Thereafter, operation ends.

FIG. 5 is a flowchart illustrating operation of a marketing system defining a marketing strategy in accordance with an illustrative embodiment. Operation begins, and the system receives a query from a merchant associated with a segment of products (block 502). The system dynamically selects a set of influencing parameters based on a ranked list of patterns (block 504). Then, the system presents to the merchant influencing parameters associated with the segment of products (block 506). Thereafter, operation ends.

FIG. 6 is a flowchart illustrating operation of a marketing system identifying merchants in accordance with an illustrative embodiment. Operation begins, and the system dynamically identifies keywords or channels associated with a product (block 602). The system identifies marketing strategies of a merchant associated with a segment of products based on a most effective channel to reach the customer (block 604). Then, the system presents to the client of a customer the set of marketing strategies defined by the merchant for the segment of products as a ranked list to the customer (block 606). Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for defining marketing strategies for a merchant and identifying a customer segment by mining information and associating collected information into a set of predefined patterns. For example, commerce patterns include all such freely available information and activities related to a particular merchant, product, brand, channel of communication, and segment/category of products. The mechanism of the illustrative embodiments may perform data mining, Web crawling, scuttering, and the like to collect relevant information for defining a marketing strategy. The mechanism then performs analysis on the collected information to identify patterns according to a predefined set of rules. The mechanism may group or categorize the patterns and rank the groups or patterns. The mechanism may also create mappings of related patterns, such as related consumers, products, or combinations thereof.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program stored therein, wherein the computer readable program, when executed on a marketing system computing device, causes the marketing system computing device to:
    dynamically obtain, by an information gathering agent of the marketing system computing device, information related to customer interactions associated with a given customer from a client-side agent running on a client computing device associated with the given customer via a network;
    analyze, by a pattern analysis component of the marking system computing device, the information related to customer interactions to identify patterns in the information related to the customer interactions based on a set of predefined rules;
    group, by a categorization and mapping component of the marketing system computing device, the identified patterns into a plurality of groups of patterns;
    create, by the categorization and mapping component of the marketing system computing device, a ranked list of the plurality of groups of patterns based on the set of predefined rules;
    select, by a marketing strategy selection component of the marketing system computing device, patterns from the ranked list of the plurality of groups of patterns for defining a marketing strategy for a marketer;
    identify a marketing strategy of a merchant associated with a segment of products using the ranked list of the plurality of groups of patterns; and
    present to the client computing device associated the given customer the marketing strategy via the network.

2. The computer program product of claim 1, wherein obtaining information related to customer interactions further comprises:
    performing data mining operations to collect customer interaction information from a plurality of sources.

3. The computer program product of claim 2, wherein the data mining operations comprise Web crawling or scuttering.

4. The computer program product of claim 2, wherein the customer interactions comprise at least one of a product review, a review comment, a post, a comment, or interconnected documents.

5. The computer program product of claim 1, wherein the computer readable program further causes the marketing system computing device to:
    receive a query from a merchant associated with a segment of products;
    dynamically select a set of influencing parameters based on a ranked list of patterns in response to the query; and
    present to the merchant the set of influencing parameters associated with the segment of products, thereby allowing the merchant to define marketing strategies in relation to the segment of products.

6. The computer program product of claim 1, wherein the computer readable program is stored in a computer readable storage medium in a data processing system and wherein the computer readable program was downloaded over a network from a remote data processing system.

7. The computer program product of claim 1, wherein the computer readable program is stored in a computer readable storage medium in a server data processing system and wherein the computer readable program is downloaded over a network to a remote data processing system for use in a computer readable storage medium with the remote system.

8. The computer program product of claim 1, wherein the computer readable program further causes the marketing system computing device to:
    identify a most effective channel to present the marketing strategy to reach the given customer.

9. The computer program product of claim 1, wherein the client-side agent comprises a browser plug-in or a terminate and stay resident program.

10. The computer program product of claim 1, wherein the computer readable program further causes the marketing system computing device to create mappings of related patterns.

11. An apparatus, comprising:
    a processor; and
    a memory coupled to the processor, wherein the memory comprises instructions which, when executed by the processor, cause the processor to:
    dynamically obtain, by an information gathering agent of a marketing system computing device, information related to customer interactions associated with a given customer from a client-side agent running on a client computing device associated with the given customer via a network;
    analyze, by a pattern analysis component of the marketing system computing device, the information related to customer interactions to identify patterns in the information related to the customer interactions based on a set of predefined roles;
    group, by a categorization and mapping component of the marketing system computing device, the identified patterns into a plurality of groups of patterns;
    create, by the categorization and mapping component of the marketing system computing device, a ranked list of the plurality of groups of patterns based on the set of predefined rules;
    select, by a marketing strategy selection component of the marketing system computing device, patterns from the ranked list of the plurality of groups of patterns for defining a marketing strategy for a marketer;

identify, by the marketing strategy selection component of the marketing system computing device, a marketing strategy of a merchant associated with a segment of products using the ranked list of the plurality of groups patterns; and present to the client computing device associated with the given customer the marketing strategy via the network.

12. The apparatus of claim 11, wherein obtaining information related to customer interactions further comprises:

performing data mining operations to collect customer interaction information from a plurality of sources.

13. The apparatus of claim 12, wherein the data mining operations comprise Web crawling or scuttering.

14. The apparatus of claim 12, wherein the customer interactions comprise at least one of a product review, a review comment, a post, a comment, or interconnected documents.

15. The apparatus of claim 11, wherein the instructions further cause the processor to:

identify a most effective channel to present the marketing strategy to the given customer.

16. The apparatus of claim 11, wherein the instructions further cause the processor to:

receive a query from a merchant associated with a segment of products;

dynamically select a set of influencing parameters based on a ranked list of patterns in response to the query; and present to the merchant the set of influencing parameters associated the segment of products, thereby allowing the merchant to define marketing strategies relation to the segment of products.

17. The apparatus of claim 11, wherein the client-side agent comprises a browser plug-in or a terminate and stay resident program.

18. The apparatus of claim 11, wherein the instructions further cause the processor to create mappings of related patterns.

* * * * *